(12) United States Patent
Zhu et al.

(10) Patent No.: US 10,841,061 B2
(45) Date of Patent: *Nov. 17, 2020

(54) APPARATUS AND METHOD FOR WIRELESS COMMUNICATION

(71) Applicant: Sony Corporation, Tokyo (JP)

(72) Inventors: Xudong Zhu, Beijing (CN);
Zhaocheng Wang, Beijing (CN);
Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,041

(22) Filed: Jul. 18, 2019

(65) Prior Publication Data

US 2019/0342050 A1 Nov. 7, 2019

Related U.S. Application Data

(63) Continuation of application No. 15/543,416, filed as application No. PCT/CN2016/072277 on Jan. 27, 2016, now Pat. No. 10,404,431.

(30) Foreign Application Priority Data

Feb. 13, 2015 (CN) .......................... 2015 1 0079631

(51) Int. Cl.
*H04L 5/00* (2006.01)
*H04W 72/04* (2009.01)

(52) U.S. Cl.
CPC .......... *H04L 5/0048* (2013.01); *H04L 5/0069* (2013.01); *H04W 72/0446* (2013.01)

(58) Field of Classification Search
CPC .......................... H04L 5/0048; H04W 72/0446
See application file for complete search history.

(56) References Cited

U.S. PATENT DOCUMENTS 10,404,431 B2 * 9/2019 Zhu ...................... H04L 5/0069
2009/0252099 A1 * 10/2009 Black ................ H04L 25/03343
370/329

(Continued)

FOREIGN PATENT DOCUMENTS

| CN | 101668295 A | 3/2010 |
| CN | 101772038 A | 7/2010 |
| CN | 103298124 A | 9/2013 |

OTHER PUBLICATIONS

International Search Report dated Apr. 19, 2016, in PCT/CN2016/072277, filed Jan. 27, 2016.

*Primary Examiner* — Jamal Javaid
(74) *Attorney, Agent, or Firm* — Xsensus LLP

(57) ABSTRACT

An apparatus for wireless communication includes a classification unit and an allocation unit. The classification unit classifies communication devices in a cell where the apparatus is located, the communication devices are classified into a plurality of communication device groups including a first communication device group and a second communication device group. The allocation unit allocates pilot frequency sequences in a first pilot frequency group to the first communication device group, and allocates pilot frequency sequences in a second pilot frequency group to the second communication device group. When the number of the pilot frequency sequences is insufficient, a multiplexing configuration is executed, such as communication devices in the second communication device group multiplex at least one pilot frequency sequence in the second pilot frequency group.

11 Claims, 8 Drawing Sheets

(56) References Cited

U.S. PATENT DOCUMENTS

2010/0098005 A1\* 4/2010 Lee ................... H04L 1/1861
370/329
2014/0376464 A1\* 12/2014 Nam ................... H04B 7/0639
370/329

\* cited by examiner

| | T1 | T2 | T3 | T4 | T5 | T6 |
|---|---|---|---|---|---|---|
| Cell 1, $\phi_3$ | UE5 | UE5 | UE5 | UE3 | UE3 | UE4 |
| Cell 2, $\phi_4$ | UE3 | UE4 | UE5 | UE3 | UE4 | UE5 |
| Cell 3, $\phi_5$ | UE3 | UE4 | UE5 | UE5 | UE4 | UE3 |

|  | T1 | T2 | T3 | T1 | T2 | T3 |
|---|---|---|---|---|---|---|
| $\phi_3$ | Cell 1<br>UE5 | Cell 2<br>UE3 | Cell 3<br>UE4 | Cell 1<br>UE5 | Cell 2<br>UE3 | Cell 3<br>UE4 |
| $\phi_4$ | Cell 1<br>UE3 | Cell 2<br>UE4 | Cell 3<br>UE5 | Cell 1<br>UE3 | Cell 2<br>UE4 | Cell 3<br>UE5 |
| $\phi_5$ | Cell 1<br>UE4 | Cell 2<br>UE5 | Cell 3<br>UE3 | Cell 1<br>UE4 | Cell 2<br>UE5 | Cell 3<br>UE3 |

Figure 7

|  | T1 | T2 | T3 | T1 | T2 | T3 | T1 | T2 | T3 |
|---|---|---|---|---|---|---|---|---|---|
| $\phi_3$ | Cell 1<br>UE5 | Cell 2<br>UE3 | Cell 3<br>UE4 | Cell 1<br>UE6 | Cell 2<br>UE3 | Cell 3<br>UE4 | Cell 1<br>UE5 | Cell 2<br>UE3 | Cell 3<br>UE4 |
| $\phi_4$ | Cell 1<br>UE3 | Cell 2<br>UE4 | Cell 3<br>UE5 | Cell 1<br>UE3 | Cell 2<br>UE4 | Cell 3<br>UE5 | Cell 1<br>UE3 | Cell 2<br>UE4 | Cell 3<br>UE5 |
| $\phi_5$ | Cell 1<br>UE4 | Cell 2<br>UE5 | Cell 3<br>UE3 | Cell 1<br>UE4 | Cell 2<br>UE5 | Cell 3<br>UE3 | Cell 1<br>UE4 | Cell 2<br>UE5 | Cell 3<br>UE3 |

Figure 8

|   | T1 | T2 | T3 | T1 | T2 | T3 |
|---|---|---|---|---|---|---|
| $\phi_3$ | Cell 1 UE5 | Cell 1 UE6 | Cell 2 UE3 | Cell 3 UE4 | Cell 1 UE5 | Cell 1 UE6 | Cell 2 UE3 | Cell 3 UE4 |
| $\phi_4$ | Cell 1 UE3 | Cell 2 UE4 | Cell 3 UE5 | Cell 1 UE3 | Cell 2 UE4 | Cell 3 UE5 |
| $\phi_5$ | Cell 1 UE4 | Cell 2 UE5 | Cell 3 UE3 | Cell 1 UE4 | Cell 2 UE5 | Cell 3 UE3 |

APPARATUS AND METHOD FOR WIRELESS COMMUNICATION

CROSS-REFERENCE TO RELATED APPLICATIONS

This application is a continuation of U.S. application Ser. No. 15/543,416, filed Jul. 13, 2017, which is based on PCT filing PCT/CN2016/072277, filed Jan. 27, 2016, and claims priority to CN 201510079631.1, filed Feb. 13, 2015, the entire contents of each are incorporated herein by reference.

FIELD OF THE INVENTION

The embodiments of the present disclosure generally relate to the technical field of wireless communications, and in particular to an apparatus and a method for wireless communications. More specifically, the embodiments of the present disclosure relate to a pilot allocation technology in a large-scale Multiple-Input Multiple-Output (MIMO) communication system.

BACKGROUND OF THE INVENTION

Large scale MIMO systems have been widely focused by both the academia and the industry in recent years. Theoretical studies have demonstrated that, both spectral efficiency and energy efficiency of the large-scale MIMO system can be significantly improved by using simple liner algorithms such as a zero-forcing algorithm, a minimum mean square error algorithm and the like. Therefore, the large-scale MIMO system is likely to be adopted as a key technology in next generation communication standards.

However, the system performance of the large-scale MIMO system is limited by pilot pollution problem in a scenario of, for example, multi-cell time-division multiplexing. Specifically, since the length of the pilot is limited by a coherence length of a channel, the number of orthogonal pilots is limited, and the pilots may be inevitably shared among different cells. In this case, pilot signals transmitted by user equipments in different cells using the same pilot sequence may be received by a base station in a neighboring cell, which, however, cannot effectively distinguish the pilot signals from each other, thereby resulting in interferences to uplink channel estimation at the base station. When performing uplink data detection using the interfered channel estimation, the base station may receive data from user equipments in other cells, besides data transmitted by user equipments in the cell where the base station is located, thereby resulting in inter-cell interferences in the uplink. When the base station generates a pre-coding matrix and transmits downlink data using the interfered channel estimation, besides the user equipments in the cell where the base station is located, user equipments in other cells may also receive the data, thereby resulting in inter-cell interferences in the downlink.

Theoretical studies have demonstrated that, although both spectral efficiency and energy efficiency of the large-scale MIMO system can be significantly improved, and the influences of noises and channel estimation error on the system performance are reduced as the number of antennas of the base station is increased, the inter-cell interferences caused by the pilot pollution cannot be eliminated and become one of the factors limiting the performance of the large-scale MIMO system.

In addition, conventional methods for alleviating the pilot pollution are often difficult to be adapted to current technical conditions. Therefore, in actual applications, the pilot pollution is still one of the most serious problems confronted by the large-scale MIMO system.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, there is provided an apparatus for wireless communications, including: a classification unit, configured to classify communication devices in a cell where the apparatus is located into a plurality of communication device groups, wherein the plurality of communication device groups include a first communication device group and a second communication device group; and an allocation unit, configured to allocate pilot sequences in a first pilot group to the first communication device group, and allocate pilot sequences in a second pilot group to the second communication device group, wherein at least one of the following reuse configurations is performed in the case that the pilot sequences are insufficient: at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

According to another aspect of the present disclosure, there is provided a method for wireless communications, including: classifying communication devices in a cell into a plurality of communication device groups, wherein the plurality of communication device groups include a first communication device group and a second communication device group; and allocating pilot sequences in a first pilot group to the first communication device group, and allocating pilot sequences in a second pilot group to the second communication device group, wherein at least one of the following reuse configurations is performed in the case that the pilot sequences are insufficient: at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

According to yet another aspect of the present disclosure, there is further provided an apparatus for wireless communications, including one or more processors configured to: classify communication devices in a cell into a plurality of communication device groups, wherein the plurality of communication device groups include a first communication device group and a second communication device group; and allocate pilot sequences in a first pilot group to the first communication device group, and allocate pilot sequences in a second pilot group to the second communication device group, wherein at least one of the following reuse configurations is performed in the case that the pilot sequences are insufficient: at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

According to other aspects of the present disclosure, there are also provided computer program codes and computer program products for implementing the above mentioned methods for wireless communications and a computer readable storage medium in which computer program codes for implementing the above method for wireless communications are recorded.

The apparatus and the method according to the present disclosure can obtain at least one of the following effects by causing a part of the communication devices to reuse pilot sequences: alleviating the pilot pollution, increasing the utilization efficiency of the pilot sequences, enhancing the accuracy of uplink channel estimation performed by the base station, improving the downlink pre-coding performed by the base station based on the uplink channel estimation, thereby improving the communication quality of the communication devices, and enhancing the overall performance of the system.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 7 illustrates an example of a scheme of edge pilot sequences being reused among neighboring cells:

FIG. 8 illustrates another example of the scheme of edge pilot sequences being reused among neighboring cells:

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
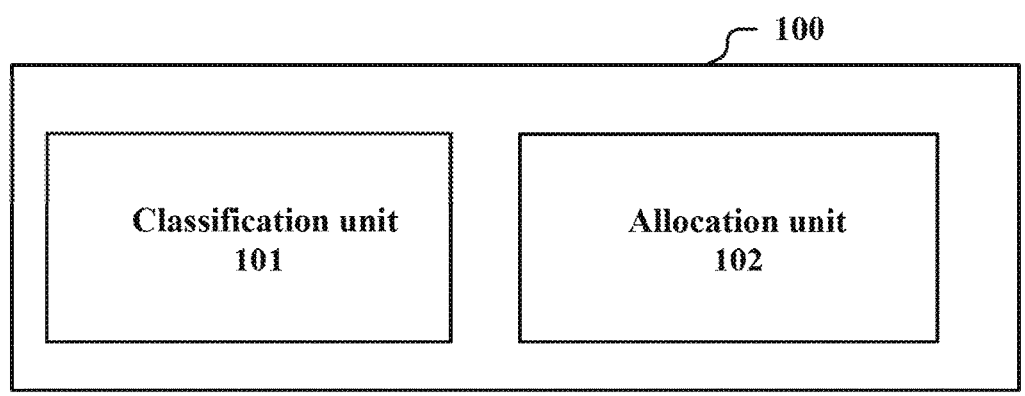
FIG. 1 illustrates a block diagram of an apparatus for wireless communications according to an embodiment of the present disclosure.

FIG. 1 illustrates a block diagram of a structure of an apparatus 100 for wireless communications according to an embodiment of the present disclosure. The apparatus 100 includes: a classification unit 101, configured to classify communication devices in a cell where the apparatus 100 is located into a plurality of communication device groups, wherein the plurality of communication device groups include a first communication device group and a second communication device group, and an allocation unit 102, configured to allocate pilot sequences in a first pilot group to the first communication device group, and allocate pilot sequences in a second pilot group to the second communication device group, wherein at least one of the following reuse configurations is performed in the case that the pilot sequences are insufficient: at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

For example, in the mobile cellular communication, the apparatus 100 may be a base station equipment. In addition, although an example of the apparatus 100 being a base station equipment is shown herein, the present disclosure is not limited thereto. For example, the apparatus 100 may also be a base-band cloud device under a C-RAN (Cloud-RAN/Centralized-RAN) structure (in which there may be no such a concept as a cell), such as any BBU in BBU pools connected in high-speed connections with each other under the C-RAN architecture. The communication device described herein may be a user equipment such as a mobile terminal, an intelligent vehicle, or an intelligent wearable device, which has cellular communication capabilities, or may be an infrastructure such as a small cell base station being capable of performing wireless communications with a macro base station.

The first pilot group and the second pilot group may be configured in advance for each cell, for example, by an OAM. Alternatively, the first pilot group and the second pilot group may be grouped and informed to respective cells by a control apparatus which manages multiple cells. In this case, the control apparatus respectively determines the first pilot group and the second pilot group for cells within the management scope of the control apparatus. For example, the control apparatus may be implemented as any type of server, such as a tower server, a rack server or a blade server, which is used for providing controlling services to multiple cells/base stations. The control apparatus may be a control module installed on the server (such as an integrated circuit module including a single wafer, and a card or a blade inserted into a slot of the blade server). The advantage of performing the grouping by the control apparatus which manages multiple cells lies in that, for example, pilot sequences contained in the first pilot group and the second pilot group of respective cells can be dynamically adjusted based on an overall consideration on the number of devices contained in the first communication device group and that in the second communication device group of respective cells, and thus the overall communication quality and the overall pilot utilization efficiency of the multiple cells can be optimized.

Further, although not shown in FIG. 1, the apparatus 100 may further include a grouping unit configured to group the pilot sequences for wireless communications into the first pilot group and the second pilot group, to be respectively allocated to the first communication device group and the second communication device group. In this case, the numbers of pilot sequences in the first pilot group and the second pilot group may be changed according to, for example, variation in a distribution of the numbers of devices in the first communication device group and the second communication device group. That is, a more flexible dynamic grouping can be implemented, so as to further increase the utilization efficiency of the pilot sequences.

As described above, due to the limitation of a channel coherence length, the number of available pilot sequences is limited. Therefore, various techniques need to be adopted to increase the utilization efficiency of pilot sequences and to alleviate the pilot pollution between neighboring cells. In the apparatus 100, the pilot sequences are grouped into the first pilot group and the second pilot group, which are respectively allocated to different communication device groups, and the pilot sequences in the second pilot group are reused intra-cell or inter-cell by the allocation unit 102.

Preferably, the pilot sequences in the first pilot group are orthogonal to the pilot sequences in the second pilot group. However, as an alternative example, the pilot sequences in the first pilot group may partially overlap with the pilot sequences in the second pilot group, thereby increasing flexibility of pilot sequence allocation, in order to cope with a scenario where the pilot sequences are insufficient, for example, due to a sudden increase in the number of the communication devices in the cell.

Preferably, the above reusing is time-division reusing, i.e., different communication devices occupy different time resources, in order to avoid pilot pollution. Alternatively, the reusing may also be code-division reusing. In the following, a specific description is made by taking the time-division reusing as an example. However, it is to be noted that, the description is not restrictive, and can be expanded to other reusing manners.

In an example, the classification unit 101 is configured to classify a communication device on an edge of a cell into the second communication device group. In other words, the second communication device group is an edge communication device group.

Correspondingly, the first communication device group is a center communication device group. The communication devices on the cell edge are susceptible to interferences from communication devices in the neighboring cell, while the communication devices in the cell center have better channel conditions and are less susceptible to interferences from the neighboring cell.

Therefore, the following configuration can be made: at least part of the pilot sequences in the first pilot group corresponding to the cell are the same as at least part of the pilot sequences in a first pilot group corresponding to the neighboring cell, and the pilot sequences in the second pilot group corresponding to the cell are different from the pilot sequences in the second pilot group corresponding to the neighboring cell. In this way, pilot sequences are allocated by distinguishing different channel conditions of the cell edge and the cell center, and the limited pilot sequences can be fully utilized while avoiding the pilot pollution problem. In the following, the pilot sequences in the first pilot group are also referred as center pilots, and the pilot sequences in the second pilot group are also referred as edge pilots.

In this case, the apparatus 100 may determine, based on, for example, a cell ID (CID) of the cell, the pilot sequences contained in the second pilot group corresponding to the cell. Specifically, for example, the control apparatus mentioned above may divide all of the pilot sequences to be allocated to the edge communication devices of cells into multiple pilot sub-groups, and allocate one of the pilot sub-groups to each cell according to the cell ID of the cell, for example, by a mod(CID, N) operation. For example, in the case that there are at least 3 pilot sub-groups, a serial number of a pilot sub-group of a cell may be determined according to a value of CID of the cell mod 3, thereby ensuring that the same pilot sub-group would not be allocated to neighboring cells. The allocation may also be performed based on calculating using such as a coloring algorithm. Further, the pilot sub-groups may be determined in advance, for example, may be configured by an OAM, and the apparatus 100 can directly determine the pilot sequences allocated to the edge communication device of the cell where the apparatus 100 is located according to CID.

Since neighboring cells use different pilot sub-groups, the number of pilot sequences in the pilot sub-group of each cell may be quite limited. According to an example of the present disclosure, in the case that the number of the pilot sequences in the second pilot group corresponding to the cell is less than the number of the communication devices in the second communication device group, the allocation unit 102 configures at least part of the communication devices in the second communication device group to occupy different time resources so as to transmit at least one of the reused pilot sequences in the second pilot group. By enabling several communication devices to reuse one pilot sequence in a time division manner, the pilot pollution can be avoided, and the utilization efficiency of pilot sequences can be increased.

The different time resources correspond to, for example, different time slots, and for one time slot, the communication devices configured to occupy other time slots to transmit pilot sequences do not transmit any data or pilot sequence. Of course, for one time slot, the communication devices configured to occupy other time slots may transmit only data. In addition, the time resources may also refer to subframes, frames, or the like. That is, different subframes or frames are allocated to different communication devices. Although the following description is given by taking time slots as an example of the time resources, the present disclosure is not limited thereto, and the time resources may also be time units with other definitions.

Figure 2:
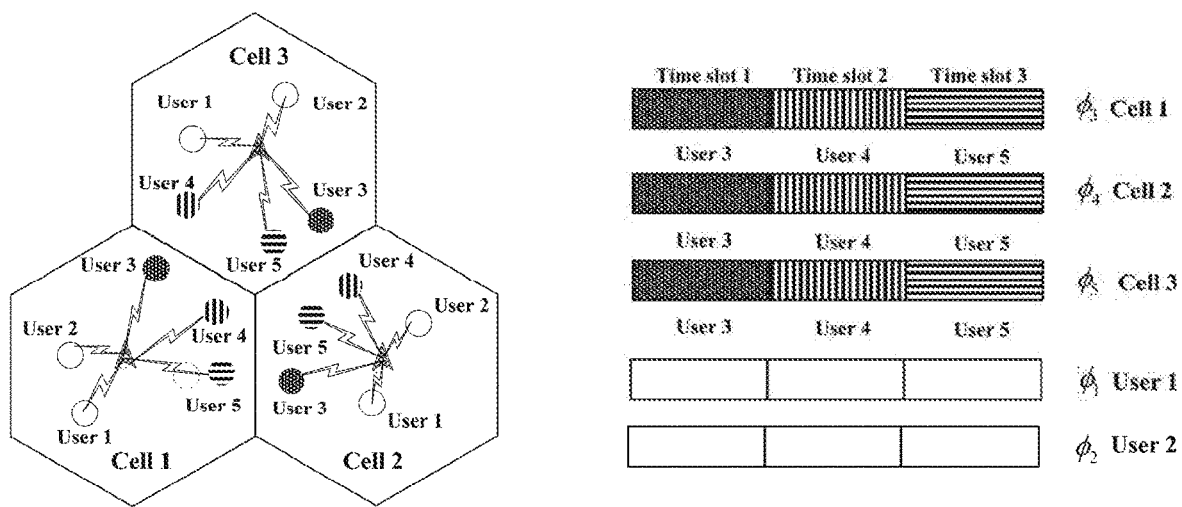
FIG. 2 illustrates a schematic example of the communication devices in the second communication device group of the cell reusing pilot sequences.

FIG. 2 illustrates a schematic example of the communication devices in the second communication device group of the cell reusing pilot sequences, where a multi-cell multi-user mobile cellular network scenario is shown on the left side. It is assumed that a radius of the cell is 500 meters, a propagation path loss index is 2, and the shadow fading effect is not taken into consideration. It is also assumed that positions of users are fixed, and influences from noises are neglected. As shown in FIG. 2, assuming that each of cells 1 to 3 has 5 users, the number of available orthogonal pilot sequences is 5, where a first pilot group $\{\phi_1,\phi_2\}$ is allocated to center users (user 1 and user 2) of three cells, and second pilot groups $\{\phi_3\}$, $\{\phi_4\}$, and $\{\phi_5\}$ are respectively allocated to edge users (user 3, user 4 and user 5) of three cells.

The center users can directly use the pilot sequences in the first pilot group, with center users in neighboring cells using the same pilot sequences. For edge users, the allocation unit 102 enables three edge users in the cell to share one pilot sequence in a time-division reusing manner. The specific allocation conditions of the pilot sequences are shown on the right side of FIG. 2. As can be seen, in this example, the center users 1 and 2 respectively occupy all of the time slots of $\phi_1$ and $\phi_2$, while in respective cells, the edge users 3 occupy time slots 1 of $\{\phi_3\}$, $\{\phi_4\}$, and $\{\phi_5\}$ respectively, the edge users 4 occupy time slots 2 of $\{\phi_3\}$, $\{\phi_4\}$, and $\{\phi_5\}$ respectively, and the edge users 5 occupy time slots 3 of $\{\phi_3\}$, $\{\phi_4\}$, and $\{\phi_5\}$ respectively. In this case, the pilot sequence in the second pilot group of each cell is occupied by only one user at the same time instant, thereby avoiding intra-cell and inter-cell pilot pollutions. Further, since the time-division reusing scheme is adopted, multiple users, of which the number is greater than the number of pilot sequences, are enabled to use same pilot sequences, and a good supplementation for the above technical scheme where neighboring cells use different second pilot groups is further provided.

Figure 3:
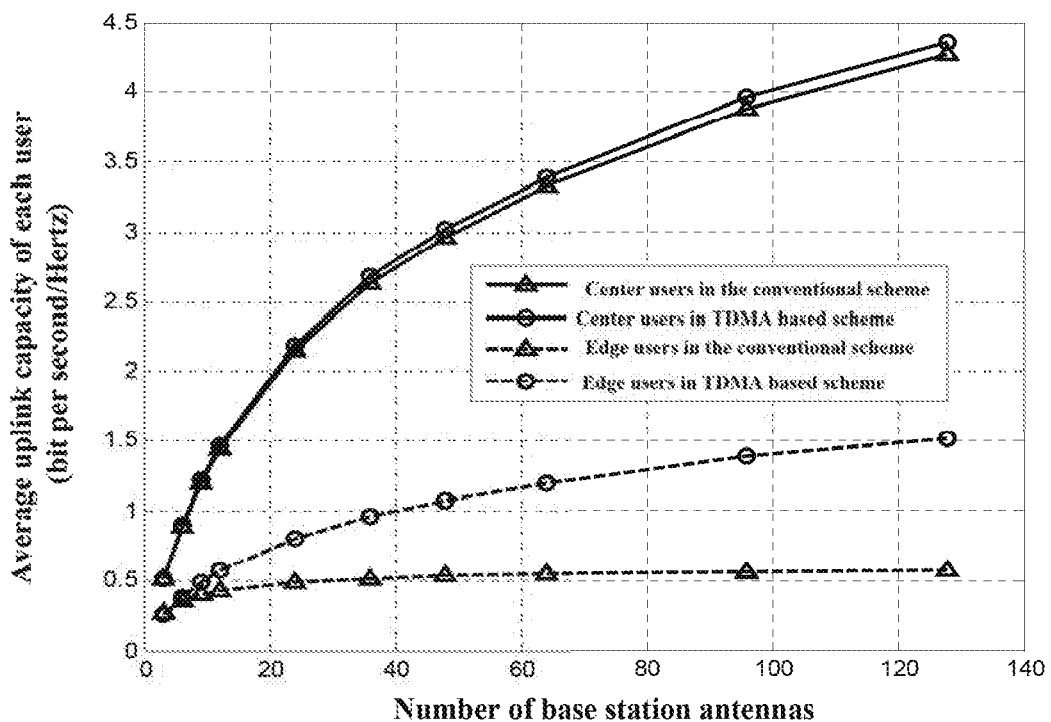
FIG. 3 illustrates a graph showing the comparison between system performance acquired by using a conventional method and that acquired by using the time-division reusing method according to the present disclosure.

FIG. 3 illustrates a trend of the variation of an average uplink capacity of users with the number of base station antennas M in this example. The average uplink capacity of center users in an i-th cell can be calculated with the following equation (1):

$$C_i = E\{\log_2(1+\text{SINR}_{ik})\}, k=1,\ldots,K_1 \qquad (1)$$

where $K_1$ represents the number of center users. $\text{SINR}_{ik}$ represents a signal-to-interference-and-noise ratio of a k-th center user in the i-th cell. Similarly, the average uplink capacity of edge users can be calculated with the following equation (2):

$$C_i = \frac{1}{K_2} E\{\log_2(1+\text{SNR}_{ik})\}, \qquad (2)$$
$$k = K_1+1,\ldots,K$$

where K is the number of all users, the factor $1/K_2$ represents an efficiency factor due to the time-division reusing method. Solid lines in FIG. 3 illustrates average uplink capacities respectively acquired by using a conventional method and the time-division reusing method according to the present disclosure (based on a TDMA scheme) for the center users, while dotted lines illustrates a comparison between performances respectively acquired using the two methods for edge users, where triangles represent the conventional method, and circles represent the method according to the present disclosure. As can be seen, a subtle increment in performance can be provided for the center users by using the time-division reusing method according to the present disclosure, since in the conventional method, K users are performing communications simultaneously in a cell, while in the method according to the present disclosure, the number of users performing communications in a cell within any time slot is less than K, and thus interferences within the cell are reduced. However, in the conventional method, the capacity of the edge users, which is about 0.5 bps/Hz as shown in FIG. 3, is low due to the pilot pollution, and can not increase with the number of base station antennas. By using the method according to the present disclosure, the edge users share edge pilot sequences in a time-division reusing manner, and thus the pilot pollution is completely eliminated. In the case that the number of base station antennas is small, the performance acquired using the method according to the present disclosure is close to the performance acquired using the conventional method. However, when the number of the base station antennas increases, the average uplink capacity of edge users increases significantly since there is no pilot pollution. For example, in the case that the number of base station antennas M=128, the average uplink capacity of edge users in this example acquired using the method according to the present disclosure is about three times of that acquired using the conventional method.

Figure 4:
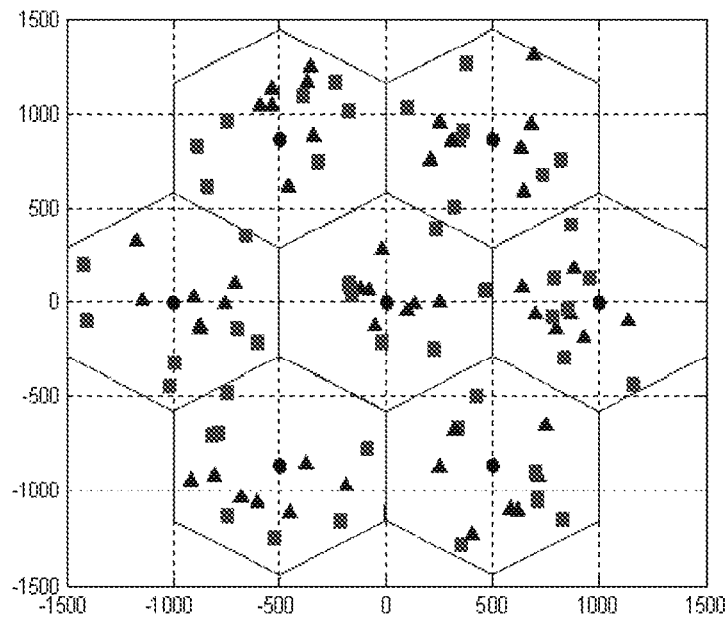
FIG. 4 illustrates a schematic diagram of a multi-cell multi-user mobile cellular system which is closer to the actual situation.

FIG. 4 illustrates a schematic diagram of another multi-cell multi-user mobile cellular system which is more complex and closer to the actual situation. A simulation is performed on this system in order to acquire a performance comparison between the conventional method and the method according the present disclosure. In this system, there are a total of 7 cells, i.e., L=7, the number of base station antennas M is from 3 to 128, the number of users K in the cell (i.e., the total number of pilot sequences) is 14, the number of center pilot sequences $K_1$ is 7, a radius of the cell R is 500 meters, a cell edge signal-to-noise ratio SNR is 20 dB, a user average emission energy is 0 dB, a base station average emission energy is 10 dB, a path loss exponent α is 2, and a logarithmically distributed shadow fading σ is 8 dB.

A large-scale fading factor of $\beta_{ijk}$ of a channel between a k-th user in a j-th cell to a base station in an i-th cell is calculated using the following equation (3).

$$\beta_{ijk} = \frac{z_{ijk}}{(r_{ijk}/R)^\alpha} \quad (3)$$

where $z_{ijk}$ represents a shadow fading effect coefficient, which follows a logarithmic distribution with a standard deviation σ=8 dB(10 $\log_{10}(z_{ijk})$ follows a Gaussian distribution with a mean 0 and a standard deviation σ), $r_{ijk}$ represents a distance between the k-th user in the j-th cell to the base station in the i-th cell. During each simulation, positions of users are randomly generated. Squares and triangles in FIG. 4 respectively represent center users and edge users (the related classification of the center users and the edge users will be described specifically later).

Figures 5, 6:
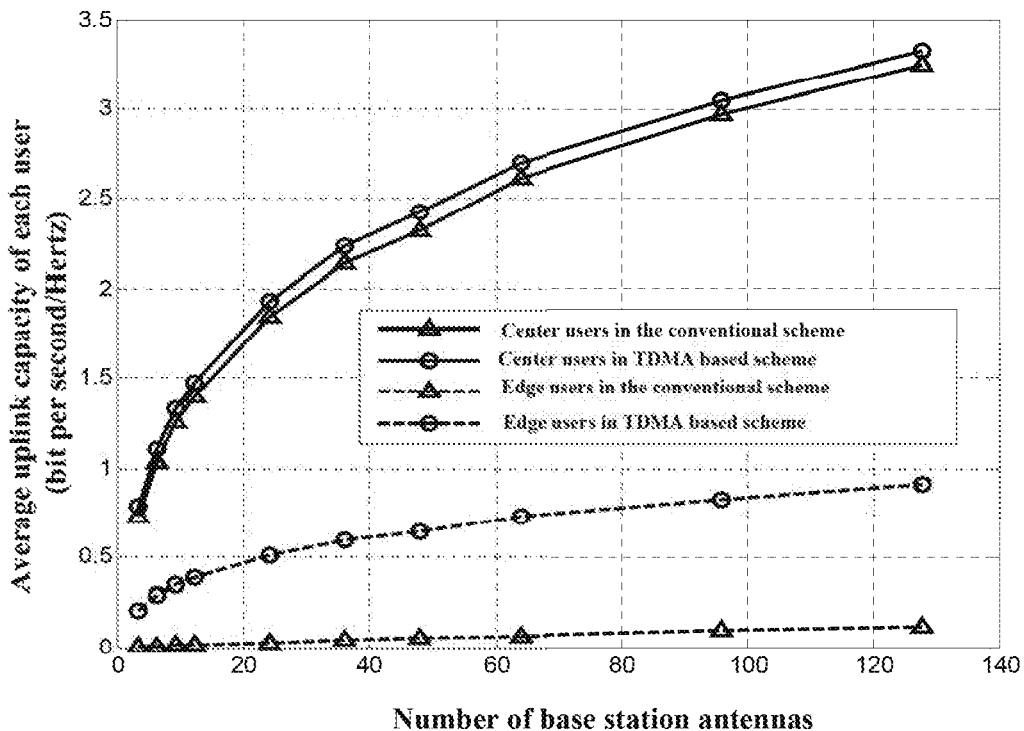
FIG. 5 illustrates a simulation result based on the mobile cellular system shown in FIG. 4.
FIG. 6 illustrates an example of a non-uniform time-division reusing scheme.

FIG. 5 illustrates average uplink channel capacities of users in this complex scenario. As can be seen, for the center users, the performances respectively acquired using the conventional method and the time-division reusing method according to the present disclosure are similar. However, for the edge users, since there are a relatively great number of neighboring cells in the actual system (up to 6), the pilot pollution problem is serious, and thus the edge users can hardly communicate with the base station. Even in the case that the number of base station antennas M reaches a maximum number of 128, the channel capacity is still only about 0.1 bps/Hz. However, by using the method according to the present disclosure, the uplink channel capacity of the edge users can increase with the number of base station antennas M, and reach about 1 bps/Hz in the case that the number of base station antennas M is 128. The communication quality of the edge users is greatly enhanced as compared with the conventional method.

It is to be noted that, in the above method, time slots are of a uniform length in time. However, the time slots may be set to have different lengths. In addition, the allocation unit 102 of each cell may decide the manner in which the edge users reuse pilot resources by itself, for example, the allocation unit 102 may decide a certain edge user would occupy which one or ones of time slots by itself. FIG. 6 illustrates an example of a non-uniform time-division reusing scheme. In cell 1, 3 of 6 time slots are allocated to edge user (UE) 5, 2 time slots are allocated to edge user 3, and only 1 time slot is allocated to edge user 1. In cell 2, the allocation is performed in a fixed cycling order. In cell 3, the allocation manner is flexible. Of course, the time slots in this example may be replaced by sub-frames or frames, or the like.

In the above description, the pilot sequences in the second pilot group corresponding to the cell are different from the pilot sequences in the second pilot group corresponding to the neighboring cell. However, the following configuration may be performed: at least part of the pilot sequences in the second pilot group corresponding to the cell are the same as at least part of the pilot sequences in the second pilot group corresponding to the neighboring cell, and the allocation unit 102 is configured to cause at least part of the communication devices in the second communication device group of the cell and the communication devices in the second communication device group of the neighboring cell to reuse the part of pilot sequences.

In other words, since neighboring cells use different pilot sub-groups, the number of pilot sequences in the pilot sub-group of each cell may be quite limited. According to an example of the present disclosure, a part of pilot sequences may be reused between cells. The reusing here may be one of time-division reusing and code-division reusing. The time-division reusing is still taken as an example. The allocation unit 102 may be configured to determine, for each of the part of pilot sequences, a time slot within a frame to be occupied by the communication device in the second communication device group of the cell, so as to coordinate with the neighboring cell. That is, as long as it is ensured that in each time slot, the pilot sequences used by the communication devices in the second device group of the cell are orthogonal to the pilot sequences used by the communication devices in the second device group of the neighboring cell.

Figures 9, 10:
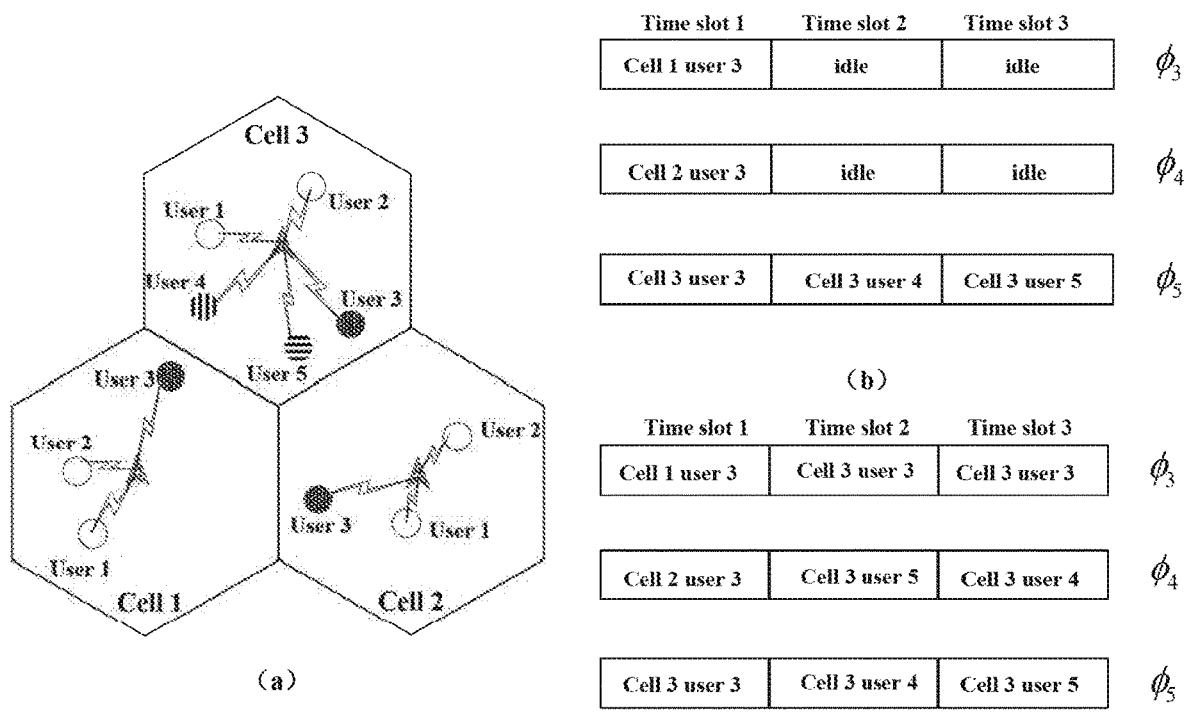
FIG. 9 illustrates another example of the scheme of edge pilot sequences being reused among neighboring cells.
FIG. 10 illustrates an example of adjusting the reusing scheme through signaling interaction.

The simple system shown in FIG. 2 is still taken as an example. The first communication device group includes user 1 and user 2, the second communication device group includes users 3, 4 and 5, the first pilot group includes pilot sequences $\phi_1$ and $\phi_2$ (which are center pilot sequences), and the second pilot group includes pilot sequences $\phi_3$, $\phi_4$ and $\phi_5$ (which are edge pilot sequences). FIGS. 7 to 9 illustrate examples of the schemes of edge pilot sequences being reused among neighboring cells.

As shown in FIG. 7, in time slot T1, edge pilot sequences $\phi_3$, $\phi_4$, and $\phi_5$ are used by three edge users in cell 1. As an example, edge users in cell 2 and cell 3 are in the sleep state, that is, they do not transmit data and pilot sequences. Similarly, in time slot T2, edge pilot sequences $\phi_3$, $\phi_4$, and $\phi_5$ are used by three edge users in cell 2, and edge users in cell 1 and cell 3 are in the sleep state. In time slot T3, edge pilot sequences $\phi_3$, $\phi_4$, and $\phi_5$ are used by three edge users in cell 3, and edge users in cell 1 and cell 2 are in the sleep state. Of course, for each time slot, edge users of cells which do not occupy this time slot may also transmit only data in this time slot.

As an example, the allocation unit 102 is configured to determine, according to a cell ID of the cell, a position of the time slot to be occupied by the communication device. For example, it is possible to perform modulo operation of the cell ID on a predetermined value such as the maximum number of neighboring cells and take the acquired remainder as the time slot to be occupied by the communication device.

FIG. 8 illustrates another reusing scheme, which is different from the scheme shown in FIG. 7 in that, cell 1 has 4 edge users, i.e., cell 1 further includes edge user 6. The scheme shown in FIG. 8 illustrates how user 5 and user 6 in cell 1 further reuse the edge pilot sequence in a time-division manner. As can be seen, in this scheme, user 5 and user 6 alternately occupy time slot T1 of edge pilot sequence $\phi_3$ allocated to cell 1. It should be understood that the above is only an example, and other reusing manner may be adopted.

FIG. 9 illustrates yet another reusing scheme. In schemes shown in FIG. 7 and FIG. 8, time slots are of a uniform length and consist of a basic time slot. The basic time slot includes four portions, i.e., an uplink pilot transmission portion, an uplink data transmission portion, a base station processing portion and a downlink data transmission portion. However, each time slot may consist of multiple basic time slots. For example, as shown in FIG. 9, T1 consists of 2 basic time slots. In cell 1, the 2 basic time slots are respectively used by user 5 and user 6, while in cell 2, the 2 basic time slots are both used by user 3. This reusing scheme may be considered as combining both intra-cell reusing and inter-cell reusing. In addition, time slots may be of non-uniform lengths. For example, T1 consists of 3 basic time slots, T2 consists of 2 basic time slots, and T3 consists of 1 basic time slot, or the like.

It should be understood that, the setting of the reusing scheme is not limited to the examples shown in FIGS. 7 to 9, but may be changed according to actual requirements and user distribution conditions.

As another example, the allocation unit 102 may dynamically determine a position of the time slot to be occupied by the communication device through signaling interaction between cells. In this way, time slots of the pilot sequences in the second pilot group may be allocated in a more flexible manner. For example, as long as the condition that one edge pilot sequence is occupied by only one edge user in one time slot is met, that will do. For example, the allocation unit 102 performs the interaction via X2 signaling between cells.

For example, in the case that distributions of edge users in respective cells are not uniform, this situation may be reported through signaling interaction between cells, and the reusing scheme may be adjusted accordingly. FIG. 10 (a) illustrates an example of a simple application scenario with three cells, where each of cell 1, cell 2 and cell 3 includes two center users 1 and 2, and cell 1 includes edge users 3, 4 and 5. However, each of cell 2 and cell 3 includes only edge user 3, which is different from the example shown in FIG. 2. Therefore, as shown in FIG. 10 (b), if the reusing scheme shown in FIG. 2 is still used, i.e., in time slot 2 and time slot 3, pilot sequence $\phi_3$ and pilot sequence $\phi_4$ would be idle. If the scheme shown in FIG. 10 (c) is used, the user in cell 3 may be configured to occupy the time slots of these pilot sequences, thereby increasing the utilization efficiency of pilot sequences.

Figure 11:
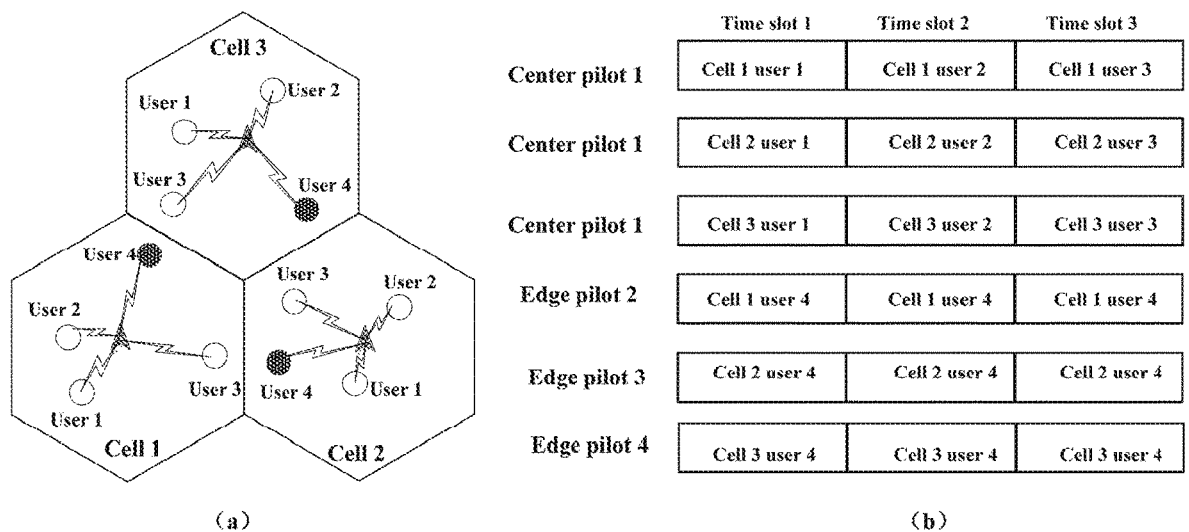
FIG. 11 illustrates an example of a scheme of center pilot sequences being reused within the cell.

In the above, situations where the pilot sequences in the second pilot group are reused are described. The communication devices in the first communication device group may also be enabled to reuse the pilot sequences in the first pilot group. For example, in the scenario shown in FIG. 2, FIG. 4 or FIG. 10, if the number of the edge users is small, but the edge users have high requirement on communications, while the number of center users is great, the center users may be enabled to reuse the center pilot sequences. FIG. 11 illustrates an example of center users reusing center pilot sequences in a time-division manner. As shown in FIG. 11(a), there are a total of 3 cells, each cell has 4 users, of which three are center users, and one is an edge user, and there are a total of 4 orthogonal pilot sequences. As shown in FIG. 11(b), one of the pilot sequences is a center pilot sequence, and the other three pilot sequences are edge sequences. For edge user 4, since each cell includes only one edge user, it is not necessary to perform reusing, instead, the edge users can directly use the edge pilot sequences. For center users, since each cell includes three center users, these center users need to reuse the center pilot sequences in a time-division manner.

In summary, the apparatus 100 according to the present disclosure is capable of increasing the utilization efficiency of pilot sequences while enhancing the overall performance of the communication system, by enabling communication devices to reuse pilot sequences intra-cell and/or inter-cell.

Second Embodiment

Figure 12:
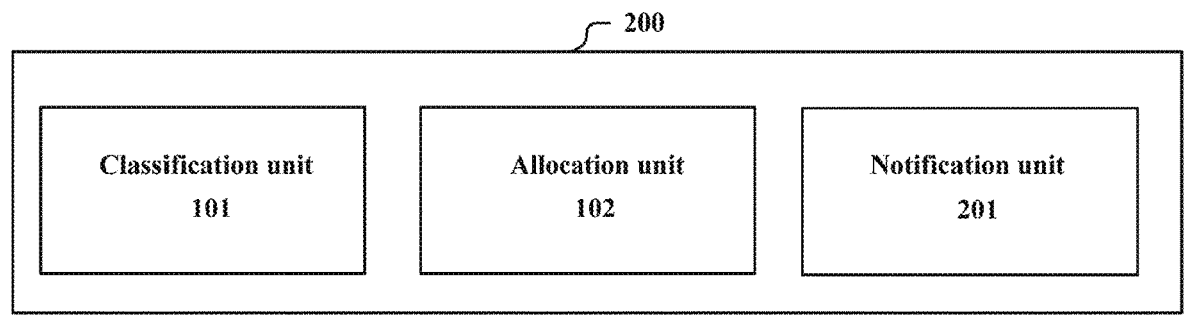
FIG. 12 illustrates a block diagram of an apparatus for wireless communications according to another embodiment of the present disclosure.

FIG. 12 illustrates a block diagram of an apparatus 200 for wireless communications according to another embodiment of the present disclosure. Besides the units shown in FIG. 1, the apparatus 200 further includes a notification unit 201 configured to notify a corresponding communication device of information on the allocated pilot sequence and time resource.

The information may be contained in, for example, at least one of PDCCH signaling and RRC signaling.

For example, the transmission period and the subframe offset of the pilot sequence may be configured using the RRC signaling. Communication devices involved in the reusing have different subframe offsets. As described above, the allocation unit 102 may select, according to the cell ID, an edge pilot sequence which takes a cyclic shift as the index. The apparatus 200 may further include a signaling generation unit (not shown in FIG. 12), which is configured to generate the RRC signaling which includes the transmission period and the subframe offset of the pilot sequence and information indicating the cyclic shift of the pilot sequence.

The pilot sequence here may be uplink pilot sequence allocation, such as allocation of SRS (Sounding Reference Signal) in the LTE-A standard.

Further, in an example of the present disclosure, when a target UE needs to reuse a certain pilot sequence with another UE, the target UE does not transmit the pilot sequence when the time slot is occupied by the another UE. Therefore, a scheduler contained in the apparatus 200 schedules, based on the allocation configuration of the pilot sequence, physical resources for the target UE, and thus does not allocate resources to the target UE for data transmission thereby avoiding waste of resources. For example, for a resource block (RB) in a corresponding time slot, the signaling generation unit generates corresponding downlink control information for resource scheduling for only UEs other than the target UE, and maps the information to PDCCH signaling for transmission.

In the case that there exist interactions between cells as described in the first embodiment, the notification unit 201 may further be configured to transmit information such as user distribution conditions of the cell where the apparatus 200 is located to the neighboring cell, so as to implement interactions between cells.

Third Embodiment

As described in the first embodiment, the classification unit 101 classifies communication devices on the cell edge to the second communication device group. In this embodiment, the classification unit may be configured to perform the classification according to channel conditions of the communication device. For example, a communication device with good channel conditions is classified into the first communication device group, and a communication device with poor channel conditions is classified into the second communication device group.

Figure 13:
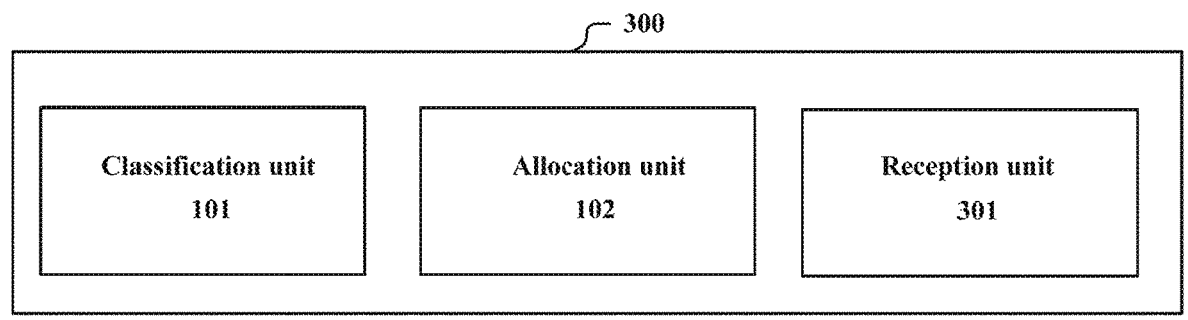
FIG. 13 illustrates a block diagram of an apparatus for wireless communications according to another embodiment of the present disclosure.

As shown in FIG. 13, besides the units in the apparatus 100, the apparatus 300 for wireless communications according to this embodiment further includes a reception unit 301 configured to receive channel quality measurement information and/or a radio resource management measurement report from the communication device. The channel quality measurement information and/or the radio resource management measurement report are used by the classification unit 101 to determine the channel conditions of the communication device. Although not shown in FIG. 13, the apparatus 300 may also include the notification unit 201 shown in FIG. 12.

The channel quality measurement information such as CQI is used for indicating the communication quality between the communication device and the base station currently serving the communication device. The radio resource management measurement report indicates a signal reception intensity of the communication device for the neighboring cell. For example, transmission of the measurement report may be triggered only in the case that a certain condition is met. For example, in LTE-A, the user equipment reports to the base station only the measurement result of the neighboring cell for which the signal reception intensity is great enough or meets a predetermined condition.

The reception unit 301 receives at least one of the above two types of information. The classification unit 101 determines the channel conditions of the communication device according to the received information, and classifies the communication device into the first communication device group or the second communication device group. For example, in the case that the channel conditions are good, the communication device is determined as a center user and classified into the first communication device group, otherwise, the communication device is classified into the second communication device group.

In an example, in the case that the signal reception intensity for the neighboring cell is above a predetermined threshold, the classification unit 101 classifies the communication device into the second communication device group. This is because a high signal reception intensity for the neighboring cell indicates that the communication device is subjected to a severe interference from the neighboring cell, and thus the communication device has poor channel conditions and should be determined as the edge user. In the case that there exist reports for multiple neighboring cells, if a maximum signal reception intensity among them reaches the predetermined threshold, the communication device can be determined as the edge user.

In addition, the communication device may also be determined as the edge user in the case that the signal reception intensity for the neighboring cell is higher than the signal reception intensity for the cell where the communication device is located. Of course, the determination may also be made according to only the signal reception intensity for the cell where the communication device is located. For example, the communication device may be determined as the edge user in the case that the signal reception intensity for the cell where the communication device is located is lower than a predetermined threshold.

Further, the judgment of the edge user may also be performed by dynamically configuring corresponding conditions as required. For example, when there are a relatively great number of idle edge pilot sequences, the edge user judgment condition may be set to be less strict, and more users may be determined as edge users; while when the edge pilot sequences are insufficient, the edge user judgment condition may be set to be stricter such that more users use the center pilot sequences.

In another example, the classification unit 101 is configured to rank the communication devices according to channel qualities, and classify a predetermined number of communication devices with optimum channel qualities into the first communication device group and classify the rest of communication devices into the second communication device group. In this case, the classification is performed according to, for example, only the signal reception intensity for the cell where the communication device is located. The predetermined number may be the number of pilot sequences in the first pilot group, i.e., the center users use pilot sequences which are orthogonal to each other, and the edge users may reuse the edge pilot sequences.

In addition, the classification may be performed according to the signal reception intensities for the neighboring cell. For example, the classification unit 101 ranks the communication devices according to signal reception intensities for the neighboring cell, and classifies a predetermined number of communication devices with greatest signal reception intensities into the second communication device group and classifies the rest of communication devices into the first communication device group. The predetermined number may be the number of pilot sequences in the second pilot group, i.e., the edge users use pilot sequences which are orthogonal to each other, and the center users may reuse the center pilot sequences.

Of course, the determination whether the communication device is the center user or to the edge user may be performed by the communication device itself, and the determination result is notified by the communication device to the apparatus 100.

Besides performing the classification according to channel conditions, the classification unit 101 may also classify the communication devices according to other standards.

For example, the classification unit 101 may be configured to perform the classification according to an access order of the communication devices, and preferentially classify the communication devices which are first accessed into the first communication device group. In this case, for example, the pilot sequences in the first pilot group are exclusive pilot sequences, and the pilot sequences in the second pilot group are shared pilot sequences. There are multiple users in the cell, and the time instants at which the users access to the system are different. According to a first-come first-serve principle, when a certain user accesses to the system, an idle exclusive pilot sequence, if there is any, is allocated to this user, otherwise a certain time slot of a time-division reused pilot sequence is allocated to this user.

As another example, the allocation unit 102 may preferentially perform reuse configuration on the communication device with a lower priority level. For example, when a user accesses to the system, the user simultaneously informs the system of a QoS requirement of the user, a higher QoS requirement indicates a higher priority level, while a lower QoS requirement indicates a lower priority level. The allocation unit 102 allocates a pilot sequence to the communication device according to the QoS requirement thereof. For example, the allocation unit 102 preferentially performs the reuse configuration for the communication device which performs large volume data transmission with a low latency requirement, and allocates one or more time slots of the time-division reused pilot sequences to the communication device.

In addition, apparatuses 100 to 300 may dynamically perform the operation. Specifically, the classification unit 101 is configured to dynamically perform the classification based on a state of the communication device, and the allocation unit 102 correspondingly dynamically performs allocation and reuse configuration.

For example, when the channel conditions of the communication device change, the classification unit 101 may perform reclassification, and the allocation unit 102 allocates the pilot sequence according to the result of the reclassification, and performs reuse configuration when necessary. Alternatively, when the priority level of the communication device changes, the classification unit 101 and the allocation unit 102 may also dynamically perform classification and allocation accordingly. That is, the classification unit 101 performs the classification based on trigger or request.

As an example, when a certain center user moves, its communication quality may be degraded. At this time, the center user transmits a request to the base station. On reception of the request, the base station checks whether there is an idle time slot in the edge pilot sequences of the cell. If there is an idle time slot, the base station switches the center user to the edge user and allocates the idle time slot to the edge user, in order to ensure the communication quality of the edge user. If there is no idle time slot, the base station notifies the center user to maintain its current state.

Similarly, when a certain edge user gets a better channel quality and wants to acquire a higher data transmission rate, the edge user transmits a request to the base station. On reception of the request, the base station checks whether there is an idle center pilot sequence in the cell where the base station is located. If there is an idle center pilot sequence, the base station switches the edge user to the center user. If there is no idle center plot sequence, the base station notifies the edge user to maintain its current state.

In addition, the classification unit 101 may also periodically classify the communication devices. For example, the classification unit 101 performs reclassification when a predetermined period timer expires. It should be understood that, the classification unit 101 may perform operation by combining both the periodic classification and triggered (requested) classification.

Fourth Embodiment

In the following, a structure of an apparatus 400 at the communication device side is described with reference to FIG. 14. The apparatus 400 includes: a transmission unit 401, configured to transmit a request for the pilot sequence to the base station, and a reception unit 402, configured to receive information on the allocated pilot sequence and time slot from the base station.

In an example, the transmission unit 401 is further configured to transmit the channel quality measurement information and/or the radio resource management measurement report to the base station. After that, the base station side classifies the present communication device according to the received information, and allocates the pilot sequence. In the case that reusing is required, the base station also allocates the time slot to be occupied.

Figure 14:
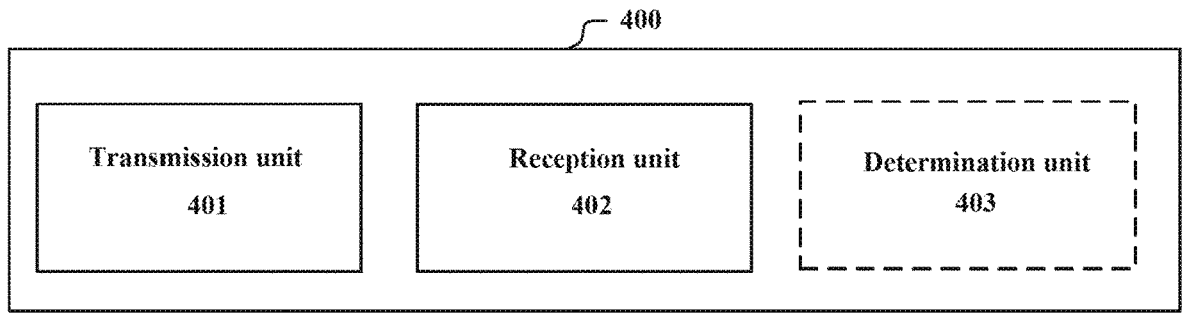
FIG. 14 illustrates a block diagram of an apparatus at a communication device side according to an embodiment of the present disclosure.

In addition, as shown by the dotted line block in FIG. 14, the apparatus 400 may further include a determination unit 403 configured to determine whether the communication device where the apparatus is located is an edge communication device or a center communication device, and the transmission unit 401 is configured to transmit a judgment identification to the base station. The judgment identification indicates whether the communication device is the edge communication device or the center communication device.

As an example, the determination unit 403 may perform the determination according to the signal reception intensity for the neighboring cell and the signal reception intensity for the cell where the communication device is located. In the case that there is a neighboring cell for which the signal reception intensity is greater than the signal reception intensity for the cell where the communication device is located, the communication device is determined as the edge communication device.

Alternatively, the reception unit 402 may also receive a threshold for the above determination from the base station.

In the case that the signal reception intensity for the neighboring cell is higher than the threshold, the determination unit 403 determines the communication device as the edge communication device. Alternatively, in the case that the signal reception intensity for the cell where the communication device is located is lower than the threshold, the determination unit 403 determines the communication device as the edge communication device.

After the determination unit 403 determines the category of the communication device, the transmission unit 402 transmits a corresponding judgment identification to the base station, to enable the base station to allocate the pilot sequence and the time slot for the communication device. The base station side may perform the classification, allocation and reuse configuration using the apparatus 100 according to the first to third embodiments. However, the present disclosure is not limited thereto.

Fifth Embodiment

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the apparatus for wireless communications can also be used in the methods.

Figure 15:
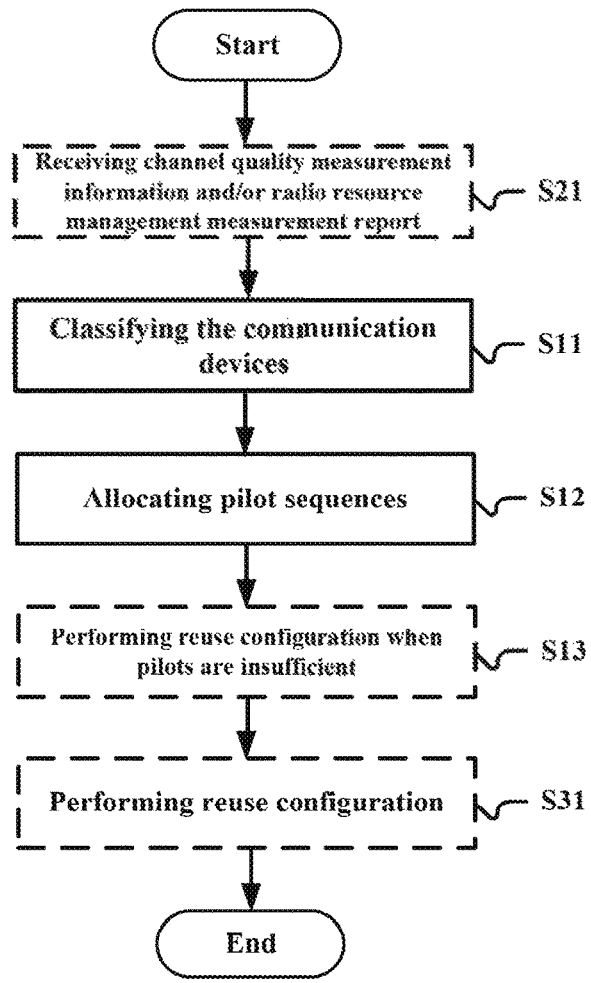
FIG. 15 is a flow chart illustrating a method for wireless communications according to an embodiment of the present disclosure.

FIG. 15 illustrates a flowchart of a method for wireless communications according to an embodiment of the present disclosure. The method includes the following steps: classifying communication devices in a cell into a plurality of communication device groups, wherein the plurality of communication device groups comprise a first communication device group and a second communication device group (S11); and allocating pilot sequences in a first pilot group to the first communication device group, and allocating pilot sequences in a second pilot group to the second communication device group (S12), wherein at least one of the following reuse configurations is performed in the case that the pilot sequences are insufficient (S13): at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

Preferably, the pilot sequences in the first pilot group are orthogonal to the pilot sequences in the second pilot group.

The above reusing may be time-division reusing, and may also be frequency-division reusing or code-division reusing.

In an example, in step S11, the communication device on a cell edge is classified into the second communication device group. The classification may be performed according to, for example, channel conditions of the communication device. As shown by the dotted line block in FIG. 15, before step S11, the method may further includes step S21, in which channel quality measurement information and/or a radio resource management measurement report are received from the communication device for determining the channel conditions of the communication device in step S11. Of course, the communication device itself may determine its own channel conditions and determine whether the communication device is the center user or the edge user according to the channel conditions. In this case, a judgment identification indicating the judgment result is received from the communication device in step S21, and the classification is performed according to the received judgment identification in step S11.

The radio resource management measurement report includes the signal reception intensity of the communication device for the neighboring cell. In the case that the signal reception intensity for the neighboring cell is above a predetermined threshold, the communication device is classified into the second communication device group in step S11.

In another example, in step S11, the communication devices are ranked according to channel qualities, and a predetermined number of communication devices with optimum channel qualities are classified into the first communication device group and the rest of communication devices are classified into the second communication device group. The predetermined number may be the number of pilot sequences in the first pilot group. Similarly, in step S11, the communication devices may also be ranked according to signal reception intensities for the neighboring cell, and a predetermined number of communication devices with greatest signal reception intensities are classified into the second communication device group and the rest of communication devices are classified into the first communication device group. The predetermined number may be the number of pilot sequences in the second pilot group.

In addition, in step S11, the classification may be performed according to an access order of the communication devices, and the communication devices which are first accessed are preferentially classified into the first communication device group. Alternatively, in step S11, reuse configuration may be preferentially performed on the communication device with a lower priority level.

Steps S11 to S13 may be dynamically performed based on a state of the communication device.

In an example, at least part of the pilot sequences in the first pilot group corresponding to the cell are the same as at least part of the pilot sequences in a first pilot group corresponding to the neighboring cell, and the pilot sequences in the second pilot group corresponding to the cell are different from the pilot sequences in the second pilot group corresponding to the neighboring cell. The pilot sequences contained in the second pilot group corresponding to the cell may be determined according to a cell ID of the cell. As described above, the first pilot and the second pilot group may be determined in advance, or may be notified by a control terminal over the base station. Alternatively, the pilot sequences may be grouped by the base station side itself. Specific details are described in the first embodiment and are not repeated here.

In the case that the number of the pilot sequences in the second pilot group corresponding to the cell is less than the number of the communication devices in the second communication device group, in step S13, at least part of the communication devices in the second communication device group are configured to occupy different time resources so as to transmit at least one of the reused pilot sequences in the second pilot group.

The different time resources correspond to different time slots. For one time slot, the communication devices configured to occupy other time slots do not transmit any data or pilot sequence.

In another aspect, at least part of the pilot sequences in the second pilot group corresponding to the cell are the same as at least part of the pilot sequences in the second pilot group corresponding to the neighboring cell. In step S13, at least part of the communication devices in the second communication device group of the cell and the communication devices in the second communication device group of the neighboring cell are caused to reuse the part of pilot sequences.

For each of the part of pilot sequences, in step S13, a time slot within a frame to be occupied by the communication device in the second communication device group of the cell is determined, so as to coordinate with the neighboring cell. That is, as long as it is ensured that at a same time instant, the pilot sequences used by the communication devices in the second device group of the cell are orthogonal to the pilot sequences used by the communication devices in the second device group of a different cell, that will do.

As an example, in step S13, a position of the time slot to be occupied by the communication device may be determined according to a cell ID of the cell. In addition, in step S13, the position of the time slot to be occupied by the communication device may be dynamically determined through signaling interaction between cells. When signaling interaction occurs between cells, a more flexible reuse configuration may be performed.

As shown by the dotted box in FIG. 15, the above method may further include step S31, in which information on the allocated pilot sequence and time resource is notified to a corresponding communication device. These information may be contained in at least one of PDCCH signaling and RRC signaling.

It is to be noted that, details of the above method are described in the first to fourth embodiments, and are not repeated here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, in the apparatus described above, the classification unit, the allocation unit, the determination unit and the like can be implemented by one or more processors, and the notification unit, the reception unit, the transmission unit and the like can be implemented by a circuit element such as an antenna, a filter, a modem and a codec.

Therefore, there is further provided an electronic device (1) according to the present disclosure, which includes circuitry configured to: classify communication devices in a cell into a plurality of communication device groups, wherein the plurality of communication device groups comprise a first communication device group and a second communication device group; and allocate pilot sequences in a first pilot group to the first communication device group, and allocate pilot sequences in a second pilot group to the second communication device group, wherein at least one of the following reuse configurations is performed in the case that the pilot sequences are insufficient: at least part of the communication devices in the second communication device group reuse at least one of the pilot sequences in the second pilot group, and at least one communication device in the second communication device group of the cell and at least one communication device in a second communication device group of a neighboring cell which is subjected to the same classification reuse at least one of the pilot sequences in the second pilot group.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
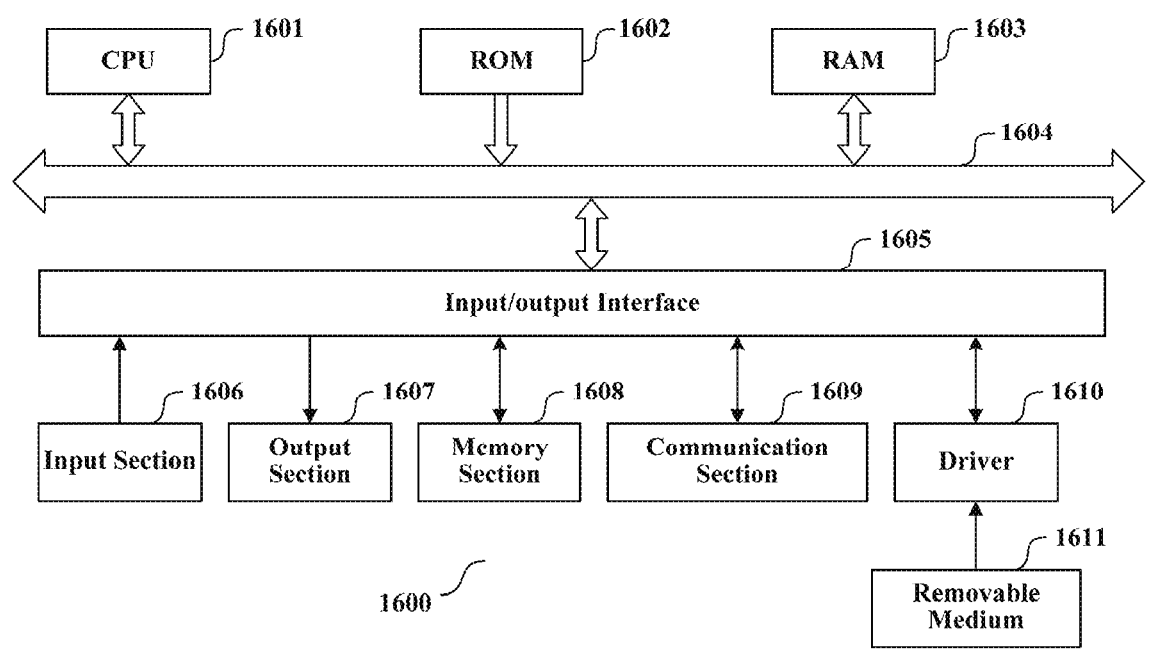
FIG. 16 is an exemplary block diagram illustrating the structure of a general purpose personal computer capable of realizing the method and/or apparatus and/or system according to the embodiments of the present disclosure.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved by software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
   circuitry configured to
      receive, from a communication device, one or more of channel quality measurement information and a radio resource management measurement report, which are used by the circuitry to determine the channel conditions of the communication device;
      classify communication devices in a cell where the apparatus is located into a plurality of communication device groups, the plurality of communication device groups comprising a first communication device group and a second communication device group; and
      allocate pilot sequences in a first pilot group to the first communication device group, and allocate pilot sequences in a second pilot group to the second communication device group, wherein
   at least one of the following reuse configurations is performed in the case that the pilot sequences are insufficient:
      at least part of the communication devices in the second communication device group reuse at least one of the pilot sequences in the second pilot group, and
      at least one communication device in the second communication device group of the cell and at least one communication device in a second communication device group of a neighboring cell which is subjected to the same classification reuse at least one of the pilot sequences in the second pilot group, and
   at least part of the pilot sequences in the first pilot group corresponding to the cell are the same as at least part of the pilot sequences in a first pilot group corresponding to the neighboring cell, and the pilot sequences in the second pilot group corresponding to the cell are different from the pilot sequences in the second pilot group corresponding to the neighboring cell.

2. The apparatus according to claim 1, wherein the pilot sequences in the first pilot group are orthogonal to the pilot sequences in the second pilot group.

3. The apparatus according to claim 1, wherein the reusing is time division reusing.

4. The apparatus according to claim 1, wherein the circuitry is further configured to perform the classification according to an access order of the communication devices, and preferentially classify the communication devices which are first accessed into the first communication device group.

5. The apparatus according to claim 1, wherein the circuitry preferentially performs reuse configuration on the communication device with a lower priority level.

6. The apparatus according to claim 1, wherein the circuitry is further configured to dynamically perform the classification based on a state of the communication device, and correspondingly dynamically perform the allocation and reuse configuration.

7. The apparatus according to claim 1, wherein the circuitry is further configured to configure at least part of the communication devices in the second communication device group to occupy different time resources so as to transmit at least one of the reused pilot sequences in the second pilot group, in the case that the number of the pilot sequences contained in the second pilot group corresponding to the cell is smaller than the number of the communication devices in the second communication device group, and the different time resources correspond to different time slots, and for one time slot, the communication devices configured to occupy other time slots do not transmit any data or pilot sequence.

8. The apparatus according to claim 1, wherein the circuitry is further configured to determine, for each of the part of pilot sequences, a time slot within a frame to be occupied by the communication device in the second communication device group of the cell, so as to coordinate with the neighboring cell.

9. The apparatus according to claim 1, wherein the circuitry is further configured to classify a communication device located on an edge of the cell into the second communication device group and perform the classification according to channel conditions of the communication device.

10. An apparatus for wireless communications, comprising:
  circuitry configured to
    classify communication devices in a cell where the apparatus is located into a plurality of communication device groups, the plurality of communication device groups comprising a first communication device group and a second communication device group; and
    allocate pilot sequences in a first pilot group to the first communication device group, and allocate pilot sequences in a second pilot group to the second communication device group, wherein
  at least one of the following reuse configurations is performed in the case that the pilot sequences are insufficient:
    at least part of the communication devices in the second communication device group reuse at least one of the pilot sequences in the second pilot group, and
    at least one communication device in the second communication device group of the cell and at least one communication device in a second communication device group of a neighboring cell which is subjected to the same classification reuse at least one of the pilot sequences in the second pilot group, and
  at least part of the pilot sequences in the first pilot group corresponding to the cell are the same as at least part of the pilot sequences in a first pilot group corresponding to the neighboring cell, and the pilot sequences in the second pilot group corresponding to the cell are different from the pilot sequences in the second pilot group corresponding to the neighboring cell,
  wherein the circuitry is further configured to perform the classification according to an access order of the communication devices, and preferentially classify the communication devices which are first accessed into the first communication device group.

11. An apparatus for wireless communications, comprising:
  circuitry configured to
    classify communication devices in a cell where the apparatus is located into a plurality of communication device groups, the plurality of communication device groups comprising a first communication device group and a second communication device group; and
    allocate pilot sequences in a first pilot group to the first communication device group, and allocate pilot sequences in a second pilot group to the second communication device group, wherein
  at least one of the following reuse configurations is performed in the case that the pilot sequences are insufficient:
    at least part of the communication devices in the second communication device group reuse at least one of the pilot sequences in the second pilot group, and
    at least one communication device in the second communication device group of the cell and at least one communication device in a second communication device group of a neighboring cell which is subjected to the same classification reuse at least one of the pilot sequences in the second pilot group, and
  at least part of the pilot sequences in the first pilot group corresponding to the cell are the same as at least part of the pilot sequences in a first pilot group corresponding to the neighboring cell, and the pilot sequences in the second pilot group corresponding to the cell are different from the pilot sequences in the second pilot group corresponding to the neighboring cell,
  wherein the circuitry preferentially performs reuse configuration on the communication device with a lower priority level.

* * * * *